United States Patent
Belin et al.

(10) Patent No.: US 7,705,917 B2
(45) Date of Patent: Apr. 27, 2010

(54) METHOD AND CIRCUIT FOR EXTRACTING SYNCHRONIZATION SIGNALS IN A VIDEO SIGNAL

(75) Inventors: Philippe Belin, Caen (FR); Nicolas Guillerm, Caen (FR)

(73) Assignee: NXP B.V., Eindhoven (NL)

( * ) Notice: Subject to any disclaimer, the term of this patent is extended or adjusted under 35 U.S.C. 154(b) by 1519 days.

(21) Appl. No.: 10/518,828

(22) PCT Filed: Jun. 23, 2003

(86) PCT No.: PCT/IB03/02887

§ 371 (c)(1),
(2), (4) Date: Dec. 21, 2004

(87) PCT Pub. No.: WO2004/004317

PCT Pub. Date: Jan. 8, 2004

(65) Prior Publication Data

US 2005/0225676 A1 Oct. 13, 2005

(30) Foreign Application Priority Data

Jun. 28, 2002 (FR) .................... 02 08132

(51) Int. Cl.
*H04N 5/10* (2006.01)
(52) U.S. Cl. ...................... 348/531; 348/695

(58) Field of Classification Search ......... 348/500–548, 348/691–698
See application file for complete search history.

(56) References Cited

U.S. PATENT DOCUMENTS 4,215,371 A * 7/1980 Baggett et al. .............. 348/695
5,367,337 A 11/1994 Pyle et al.
6,028,642 A * 2/2000 Rinaldi et al. .............. 348/540

OTHER PUBLICATIONS

Analog Devices, AD9888, pp. 1-31.

* cited by examiner

Primary Examiner—M. Lee

(57) ABSTRACT

The invention relates a method of extracting synchronization signals from an input video signal (Csync) comprising horizontal synchronization pulses at the start of video lines, for generating a horizontal synchronization signal (Hsync), said method comprising:—a calculation step (105) for calculating the duration (D) of the video lines in said input video signal (Csync),—a forcing step (108) for forcing said input video signal (Csync) to an output level, said output level corresponding to the level of said input video signal (Csync) after the horizontal synchronization pulses, said input signal (Csync) being forced between the end of each horizontal synchronization pulse and a moment defined by a first percentage (X1) of said line duration (D), for generating said horizontal synchronization signal (Hsync). Use: Extraction of synchronization signals.

8 Claims, 4 Drawing Sheets

METHOD AND CIRCUIT FOR EXTRACTING SYNCHRONIZATION SIGNALS IN A VIDEO SIGNAL

FIELD OF THE INVENTION

The invention relates to a method of extracting synchronization signals from an input video signal comprising horizontal and vertical synchronization pulses, for generating a horizontal and vertical synchronization signal.

The invention has numerous applications in integrated circuits for obtaining video synchronization signals to be used in video screen, or for the purpose of using them in digitizing a video signal to be displayed on an LCD screen.

BACKGROUND OF THE INVENTION

The display of the contents of a video signal on a digital screen of the LCD type allows to digitize this video signal at a given frequency by means of a main clock signal so as to obtain a set of elementary digital signals. These elementary digital signals are applied to picture elements or pixels which constitute the LCD screen, such that the visual content of the video signal is reproduced.

The main clock signal necessary for such a conversion is usually generated by a phase-locked loop (PLL) which receives at its input a first clock signal having the line frequency of the video signal to be digitized as its frequency, as well as a second clock signal having the frame frequency of the video signal to be digitized as its frequency. The first clock signal allows to define the main clock signal frequency, the frequency thereof being a multiple of the frequency of the first clock frequency. The second clock frequency has for its object to act on the operation of the PLL between two video frames, in particular for making the PLL operate in an open loop during the vertical synchronization pulse.

It is necessary on the one hand to provide said first clock signal at the line frequency, which signal is also referred to as horizontal synchronization signal (Hsync), and on the other hand to provide said second clock signal at the frame frequency, which signal is also referred to as vertical synchronization signal (Vsync).

The video signal comprises synchronization information in addition to the video content, irrespective of what its coding format may be. In particular, it comprises horizontal synchronization pulses marking the start of each video line and vertical synchronization pulses marking the start of each video frame, the latter having to be extracted separately so as to generate the horizontal and vertical synchronization signals.

A method implemented in the circuit referenced AD9888 from Analog Devices is known for extracting these synchronization signals from the video signal.

This method describes a counter which is decremented when the level of the video signal is in a first logic state (for example the logic "low" state corresponding to the synchronization pulses), and which is incremented when the level of the video signal is in a second logic state (for example the "high" logic state). A decremental counting by the counter during a period longer than a reference period, the value of which is directly connected to the duration of the synchronization pulses belonging to the coding format of the video signal, indicates the presence of a synchronization pulse.

The method known from the prior art for extracting the synchronization signals from a video signal has a certain number of limitations.

Since the duration of the synchronization pulses changes with the format of the video, the value of said reference period must be modified whenever the coding format of the video signal changes.

This method includes an identification of the coding format of the video signal, which leads to a complicated implementation of this method in view of the multitude of coding formats that exist. This method of extracting synchronization signals is accordingly not universally applicable because it necessitates a new parameter setting for each known format of the video signal.

On the other hand, the dimensioning of the counter is made difficult by the fact that the duration of the synchronization pulses varies widely from one coding format to another.

Finally, this method cannot be used in cases in which the coding format of the video signal cannot be recognized, for example in the presence of a proprietary coding, because it is impossible then to define said reference period.

OBJECT AND SUMMARY OF THE INVENTION

It is an object of the invention to extract synchronization signals in an input video signal automatically and independently of its coding format.

To this end, the method according to the invention comprises:
  a calculation step for calculating the duration of the video lines in said input video signal,
  a forcing step for forcing said input video signal to an output level, said output level corresponding to the level of said input video signal after the horizontal synchronization pulses, said input signal being forced between the end of each horizontal synchronization pulse and a moment defined by a first percentage of said line duration, for generating a horizontal synchronization signal Hsync.

The difficulty in extracting synchronization signals lies in the fact that the input video signal comprises not only horizontal and vertical synchronization signals, but also parasitic pulses which are to be eliminated. The parasitic pulses correspond in particular to pulses aiming at protecting the intellectual property of the video content, or to so-termed equalization pulses which are inserted in the interlaced mode on either side of the vertical synchronization pulses.

This method is based on the fact that the parasitic pulses for the video coding formats known at present are always located in a time interval $\Delta 1$ lying between the end of the horizontal synchronization pulse and a moment defined by a percentage $X1$ of the duration $\Delta$ of the video line. Forcing the level of the input video signal during said time interval allows to generate a synchronization signal in which the horizontal synchronization pulses only are present, while the parasitic pulses are suppressed.

This method is insensitive to any change in width of the horizontal synchronization pulses in the video signal. The method is equally insensitive to a variation in the duration of the video lines, for example following a line frequency change in the input video signal, because the time interval during which the forcing operation takes place is defined as a final value expressed as a percentage of the duration of the line and not by a fixed value.

This method allows to extract within a video signal the horizontal synchronization signals (Hsync) indicating the start of each video line, in particular for the UXGA coding formats having a resolution of 1600*1200 pixels, the progressive and interlaced coding formats, and the 3-levels coding format.

The method according to the invention also comprises a step prior to the calculation step, said prior step comprising
- a first measuring sub-step for measuring the duration of the low level and the duration of the high level in said input video signal between two consecutive rising edges taken from a set of rising edges of the input video signal,
- an inversion sub-step for inverting the level of said input video signal if the ratio of said duration of the low level to said duration of the high level is higher than 1 for a consecutive set of measurements carried out in said first measuring sub-step.

This method provides for an automatic detection of the polarity of the synchronization pulses. This feature allows to generate an output synchronization signal having a positive level during the synchronization pulse, whatever the polarity of the synchronization of the input video signal.

The method according to the invention is also characterized in that the calculation step comprises:
- a second measuring sub-step for measuring the durations between the consecutive rising edges taken two-by-two from among a set of rising edges of said input video signal,
- a processing sub-step for extracting the maximum value from among the durations measured in said second measuring sub-step, said maximum value corresponding to said duration of the video lines.

The calculation of the duration of the video lines is based on numerous measurements carried out in the second measuring sub-step. The processing sub-step allows not to take into account the edges relating to parasitic pulses and to horizontal synchronization pulses between the end of a video frame and the start of the next video frame. This method allows thus to generate a reliable value for the line duration.

The method according to the invention is also characterized in that the calculation step for calculating the duration of the video lines can be periodically activated so as to update the value of the duration of the video lines.

This allows to adapt the extraction process for the synchronization pulses automatically in the case of any change in format of the input video signal.

The method according to the invention is also comprises a step of generating a vertical synchronization signal from the extracted horizontal synchronization signal.

The polarity of the horizontal synchronization is inverted in the video signal between two video frames, i.e. during the generation of a vertical synchronization pulse. The extraction of the vertical synchronization pulses Vsync is thus based on the fact that if the level of a certain time range of a video line is constant and identical to the level of the horizontal synchronization pulses, i.e. being at a low level during this time range, it characterizes the presence of a vertical synchronization pulse.

This method of extracting the vertical synchronization pulses allows then to adapt to different video coding formats which are known at present.

The invention also relates to an integrated circuit comprising hardware and/or software means for implementing the steps and sub-steps of the method according to the invention as described above.

This integrated circuit allows to extract and generate horizontal Hsync and vertical Vsync synchronization signals from an input video signal. Such an integrated circuit is advantageously used for generating the horizontal and vertical synchronization signals for a PLL as described above, such that said PLL allows the generation of a main output clock signal designed for driving one or several analog-to-digital video converters.

BRIEF DESCRIPTION OF THE DRAWINGS

The particular aspects of the invention will now be explained with reference to the embodiments described hereinafter and considered in connection with the accompanying drawings, in which identical parts or sub-steps are designated in the same manner.

DETAILED DESCRIPTION OF THE INVENTION

Figure 1:
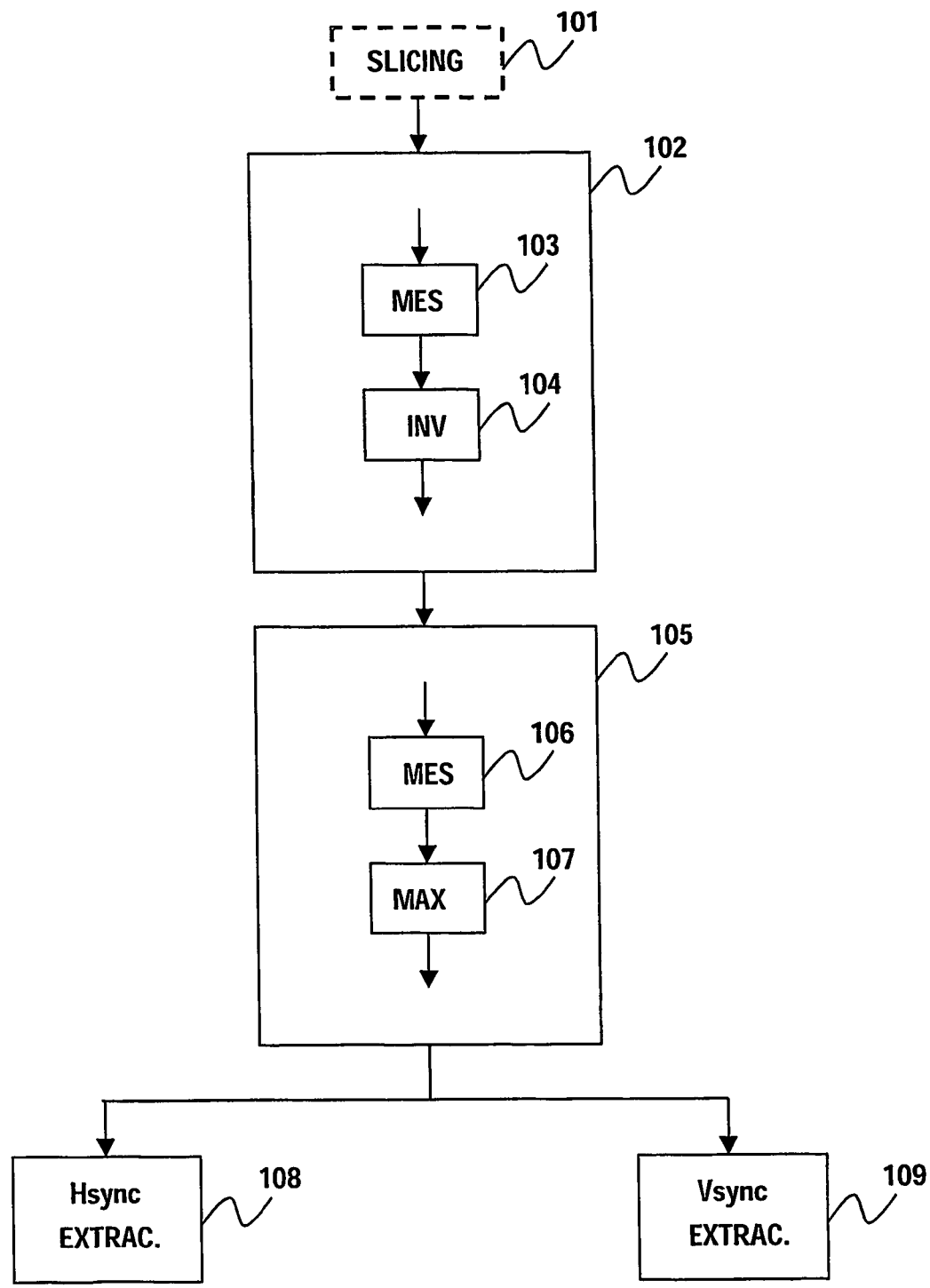
FIG. 1 is a block diagram of the steps used in the method according to the invention, FIG. 2 gives time diagrams of an input video signal in the progressive mode and the synchronization signals derived from the method according to the invention.

FIG. 1 is a block diagram of the steps used in the method according to the invention for deriving horizontal and vertical synchronization pulses from an input video signal.

To suppress the alternating components of the input video signal, the method comprises a processing step 101 which allows to cut out all information at a level higher than the blanking level. Of course, this step 101 is carried out only if the input video signal does not correspond to a composite synchronization signal. The input video signal thus modified corresponds to a composite synchronization signal Csync which comprises synchronization pulses or parasitic pulses.

In the case of an input signal with the RGB format (Red-Green-Blue), the synchronization information is usually contained in the Green component known as SOG (synchronization on green), whereas in the case of an input signal with the YcrCb format, the synchronization information is contained in the luminance component Y. The method according to the invention analyzes only those components of the input signal which contain the synchronization information so as to extract the horizontal and vertical synchronization pulses.

The method comprises a prior step 102 for conditionally inverting the level of the input video signal. To this end, the prior step 102 comprises:
- a first measuring sub-step 103 for measuring the duration of the low level and the duration of the high level in the input video signal between two consecutive rising edges taken from a set of rising edges of the signal Csync. This first measuring sub-step 103 is advantageously carried out on a set of 64 consecutive rising edges, i.e. a total duration which is sufficiently long for not taking into account rising edges defining parasitic pulses or horizontal synchronization pulses inserted between two video frames, but instead for making sure that rising edges defining horizontal synchronization pulses within a video frame are taken into account.
- an inversion sub-step 104 for inverting the level of said input video signal if the ratio of the high level duration to the low level duration is higher than 1 over this set of 64 consecutive measurements carried out by said first measuring sub-step. The input video signal Csync is thus inverted if the polarity of the synchronization pulses in signal Csync is detected as being negative.

The method comprises a calculation step 105 for calculating the duration $\Delta$ of the video lines in said input video signal Csync. This calculation is carried out on the composite synchronization signal Csync, which may have been subjected to an inversion of polarity in the inversion sub-step 104.

This calculation step 105 comprises a second measuring sub-step 106 for measuring the time durations between the consecutive rising edges, taken two-by-two, from among a set of rising edges of said input video signal. Advantageously, this step carries out a series of 1024 measurements which each have to fulfill particular conditions. In particular, P being an integer:

a measurement numbered N must not differ from the preceding measurement numbered N−1 by ±P % if it is to be considered a measurement defining this set of 1024 values, and the measurement numbered N−1 must not differ from the preceding measurement numbered N−2 by ±P %, and the measurement numbered N−2 must not differ from the preceding measurement numbered N−3 by ±P %.

If a measurement numbered N differs from the preceding measurement numbered N−1 by more than ±P %, this measurement numbered N is not taken into account, neither are the three subsequent measurements.

This calculation step 105 also comprises a processing sub-step 107 for extracting the maximum value from the set of said 1024 time durations measured in said second measuring sub-step 106, which maximum value corresponds to the duration Δ of the video lines.

Advantageously, the calculation step 105 is periodically activated so as to update the value of the video line duration Δ.

The method comprises a forcing step 108 for forcing the signal Csync to an output level corresponding to the level of said signal Csync after the horizontal synchronization pulses, said signal being forced over a time range Δ1 (defined as the duration between the end of each horizontal synchronization pulse and a moment expressed by a first percentage X1 of said line duration Δ) so as to generate the horizontal synchronization signal Hsync. If some parasitic pulses are present in signal Csync during the time duration Δ1, they are thus eliminated for forming the horizontal synchronization signal Hsync.

For synchronizing on the beginning of the line, rising edges of signal Csync are used for starting the calculation of the duration Δ1. If initially, a rising edge belonging to a pulse intended to be eliminated is used for starting the calculation of the duration Δ1, the synchronization on the beginning of the line will be performed on the following rising edge, and so one.

The method comprises a generation step 109 for generating a vertical synchronization signal Vsync in extracting the vertical synchronization pulses both in input video signals Csync in the progressive mode (i.e. non-interlaced) and in the interlaced mode, with widths of the horizontal synchronization pulses of up to 20% of the duration of the video line. The vertical synchronization signal extraction is based on the following information:

the state of the Csync signal at 25% and 75% of the line duration Δ, the state of Hsync signal at 25% of the line duration Δ, the number of rising edges in [0+, 87.5%] of the line duration Δ, where 0+ indicates that the first rising edge at the beginning of the line is not taken into account, the maximum duration of a continuous High state of Csync signal in the range [18.75%, 75%] of the line duration Δ.

By choosing the starting point of the range at 18.75% of the line duration Δ, starting pulse larger than 12.5% of the line duration Δ after Csync signal rising edge are excluded. In order to simplify the method, the method only evaluates that Csync signal is stable at multipliers of 6.25% of the line duration Δ (i.e. at 18.75%, 25%, 31.25%, . . . , 81.25%, 87.5%) three times consecutively without not returning to a Low state during this three pulses.

Advantageously, the method takes profit of the processing and analyses performed for the Vsync signal extraction for also generating a Field signal indicating the instantaneous field of the input video signals Csync.

The Vsync signal is considered active when one of the following conditions is verified:

condition 1: Csync signal at 75% is High, and Hsync signal at 25% is Low, and the number of Csync signal rising edge between [0+, 87.5%] of the horizontal line duration Δ is below or equal three, and the maximum time of continuous High state of Csync signal in the range [18.5%, 87.5%] is strictly superior than 12.5% of the line time duration Δ excepted the first pulse after Csync falling edge. The Vsync signal is changed at 87.5% of the line time duration Δ. The Field signal is changed at 87.5% of the line time duration Δ.

condition 2: Hsync signal at 25% is high. The Field output signal is given by the inverse level of Csync signal at 25% of the line time duration Δ. The Vsync signal is changed at 37.5% of the line time duration Δ. The Field output signal is changed at 37.5% of the line time duration Δ.

condition 3: Csync signal at 75% is Low, and Csync signal at 25% is High, and Hsync signal at 25% is Low, and the number of Csync signal rising edge between the range [0+, 87.5%] of the horizontal line duration Δ is between the range [1, 2], and the maximum time of continuous High state of Csync signal in the range [18.75%, 87.5%] is superior or equal 12.5% of the line time duration Δ. The Vsync signal is changed at 87.5% of the line time. The Field output signal is given by the number of rising edge in the range [0+, 87.5%] of the line time duration Δ. Indeed, if the number of rising edge is equal one, the Field output signal is Low. If the number of rising edge is equal two, the Field output signal is High. The Field is changed at 87.5% of the line duration.

Figure 2:
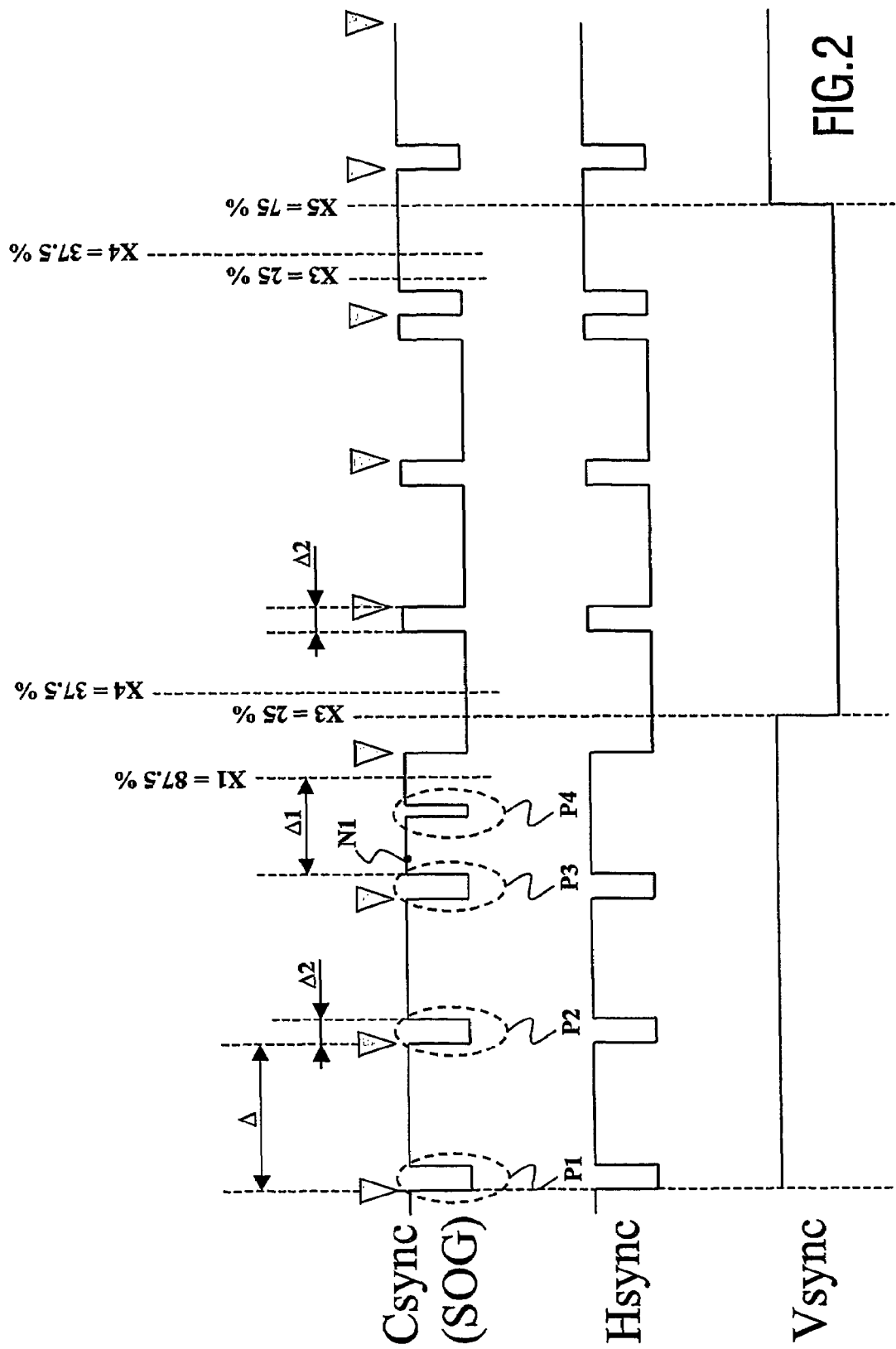

FIG. 2 shows time diagrams of an input video signal Csync in the progressive mode and the synchronization signals Hsync and Vsync which are extracted by the method according to the invention.

The input video signal Csync is a composite synchronization signal originating from the processing step 101 in which all information at a level higher than the black level has been cut out. This is a video signal in the progressive mode whose synchronization pulse polarity is negative.

The start of each video line is represented by a grey triangle. Each line of the video signal Csync comprises horizontal synchronization pulses, in particular the pulses P1-P2-P3 which are to be extracted so as to generate the synchronization signal Hsync.

All parasitic pulses are eliminated, which is the case for the pulse P4 which corresponds, for example, to a pulse aiming at protecting the intellectual property of the video content. The forcing step 108 is applied to each video line. When no parasitic pulses are present in the time ranges Δ1 (delimited by the rising edge of pulse P3 and a moment T1 defined as a percentage X1 of the line duration Δ) of the individual video lines, the synchronization signal Hsync is a basic copy of the signal Csync. The forcing step 108 plays its full function in eliminating the pulse P4. Indeed, the level of the generated signal Hsync in the time range Δ1 remains equal to the level N1 of the signal Csync after the rising edge of the pulse P3.

The synchronization signal Vsync changes to a negative level at moment T4, T4 being expressed as a percentage X4 of the line duration Δ, and to a positive level at moment T5, T5 being expressed as a percentage X5 of the line duration Δ.

Figure 4:
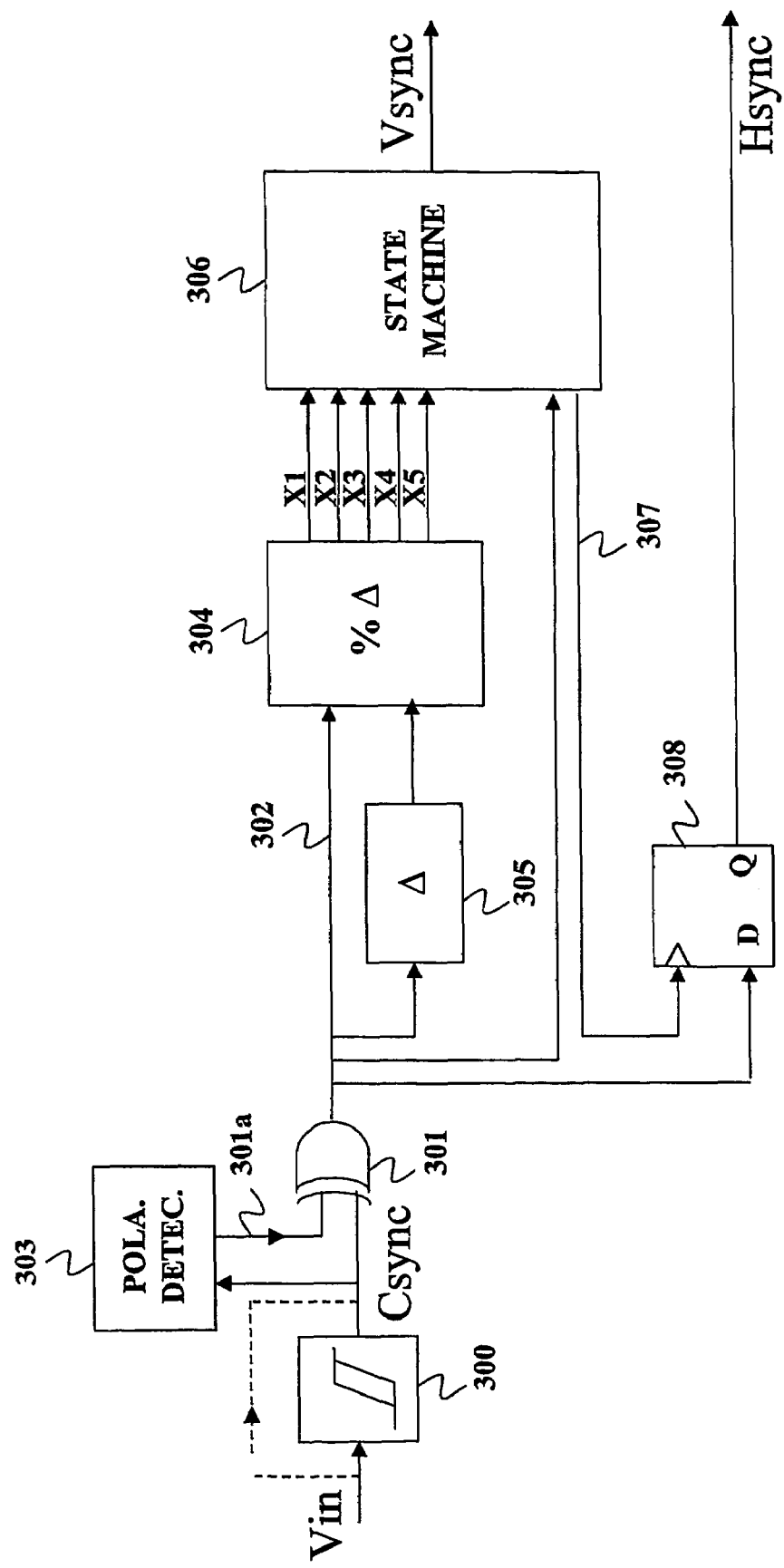

FIG. 4 shows time diagrams of an input video signal Csync in the interlaced mode with synchronization signals Hsync and Vsync which are derived from the method according to the invention.

The input video signal Csync is a composite synchronization signal originating from the processing step 101 in which all information at a level higher than the black level has been cut out. This is a video signal in the progressive mode whose synchronization pulse polarity is negative.

The start of each video line is indicated with a grey triangle. Each line of the video signal Csync comprises horizontal synchronization pulses, in particular the pulses P1-P2 which are to be extracted so as to generate the synchronization signal Hsync.

All parasitic pulses are eliminated, which is true for the pulse P3 which corresponds to an equalization pulse having a width half that of the vertical synchronization pulse. The forcing step 108 is applied to each video line.

When no parasitic pulses are present in the time ranges Δ1 (delimited by the rising edge of the pulse P2 and the moment T1 defined as a percentage X1 of the line duration Δ) of the individual video lines, the forcing step implies a basic copy of the signal Csync for defining the synchronization signal Hsync. The forcing step 108 fully plays its function in the elimination of the pulse P3. Indeed, the level of the generated signal Hsync over the range Δ1 remains equal to the logic level N2 of the signal Csync after the rising edge of the pulse P2.

The synchronization signal Vsync changes to a negative level at moment T4, T4 being expressed as a percentage X4 of the line duration Δ, and to a positive level at moment T5, T5 being expressed as a percentage X5 of the line duration Δ.

Figure 3:
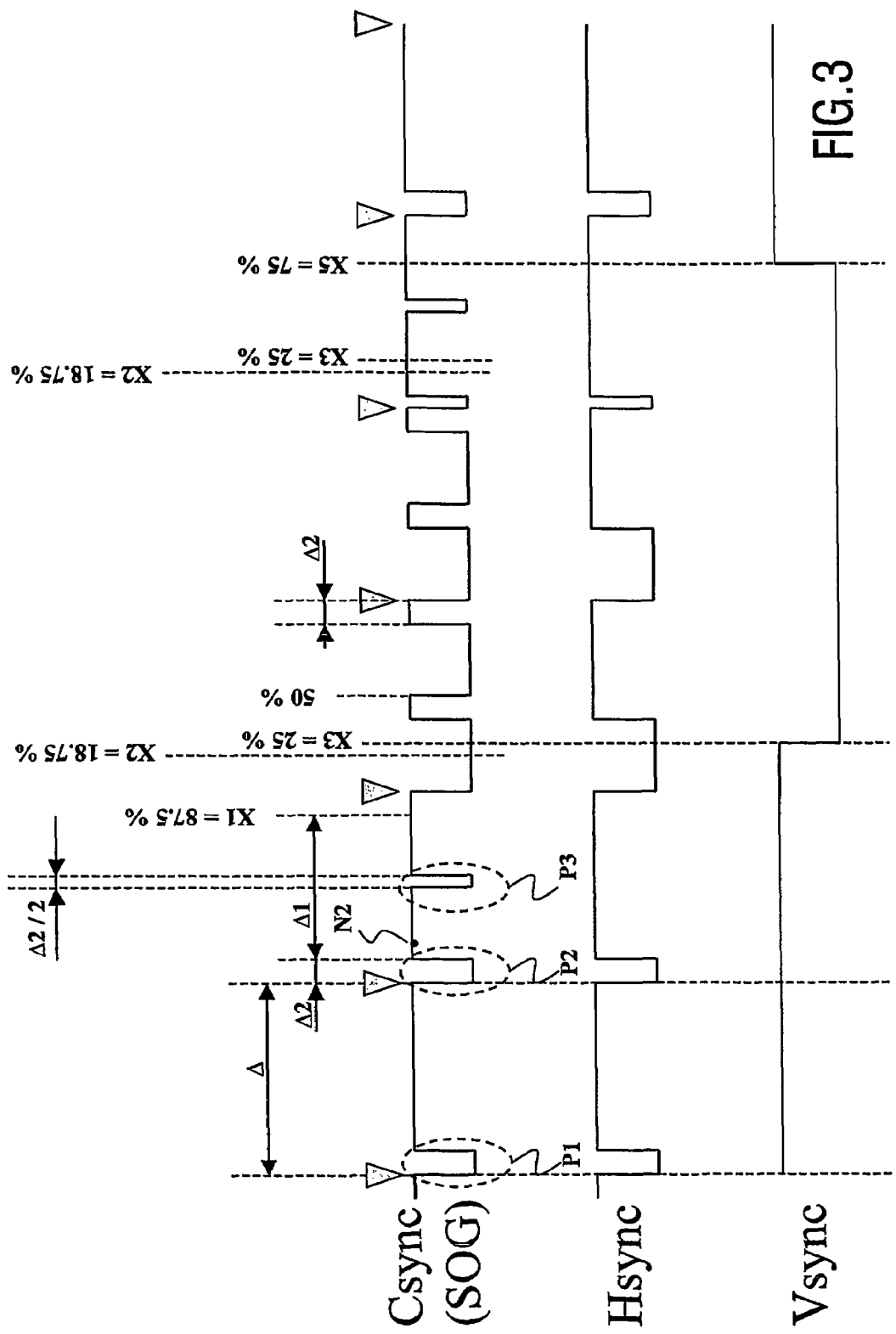
FIG. 3 illustrates an embodiment of the method according to the invention, FIG. 4 gives time diagrams of an input video signal in the interlaced mode and the synchronization signals derived from the method according to the invention.

FIG. 3 shows an embodiment of the method according to the invention for extracting horizontal and vertical synchronization pulses from an input video signal Vin. This embodiment is designed in particular for implementation in an integrated circuit.

It comprises a trigger 300 for suppressing all parts of the signal higher than the black level and thus for extracting the alternating components of the video signal Vin, thus generating the composite synchronization signal Csync. If a signal Csync is already available, the trigger is not used, and the synchronization signals are directly extracted from said composite synchronization signal.

A logic gate 301 of the exclusive OR type (also known as XOR gate) receives the signal Csync and a command signal 301a. Depending on the level of the command signal 301a, this logic gate causes an inversion of the logic level of the signal Csync so as to generate a composite synchronization signal 302. Thus, if the logic level of the signal 301a is high, the signal 302 will result from a polarity inversion of the synchronization pulses of the signal Csync, whereas the signal 302 is identical to the signal Csync if the logic level of the signal 301a is low. The signal 302 thus defines a composite synchronization signal whose synchronization pulse polarity is always the same.

A detection module 303 allows to detect the polarity of the synchronization pulses of the signal Csync. The module 303 generates a command signal 301a of high level between two rising edges of the signal Csync over a set of consecutive rising edges if the ratio between the duration of the low level and the duration of the high level is higher than 1. If it is not, the module 303 generates a command signal 301a of low level. This detection module advantageously comprises a counter of the up/down type which receives at its clock input a reference clock signal generated, for example, by a quartz crystal, and which receives the signal Csync at its input indicating the direction of counting. The counter is decremented at a high level of the signal Csync between two consecutive rising edges of the signal Csync, starting from an initial value, and is incremented at a low level of the signal Csync. If the value of the counter is higher than said initial value at the second rising edge in said set of consecutive rising edges, this indicates that the polarity of the signal Csync must be inverted, whereas if the value of the counter is lower than said initial value at the second rising edge, this indicates that the polarity of the signal Csync need not be inverted.

The module 305 provides a calculation of the duration Δ of the video lines of the signal 302. This module comprises a counter which receives a reference clock signal generated, for example, by a quartz crystal at its clock input. The counter is incremented between two rising edges of the signal 302 after a zero reset at the first rising edge. At the second rising edge, the value of this counter is locally stored in a manner such that it can be compared with three previous measurements as described with reference to sub-step 105 and FIG. 1 above.

The module 304 generates command pulses P1-P2-P3-P4-P5 at instants T1-T2-T3-T4-T5 from the signal 302 and the information on the line duration Δ, after synchronizing itself with each horizontal synchronization pulse. The module 304 comprises a counter which is reset to zero at each start of a horizontal pulse, and which receives at its clock input the same clock signal which is used by the module 305. This counter is incremented at the start of each horizontal synchronization pulse, and its instantaneous value is compared by a comparator with a set of values obtained after division of said line duration Δ. If said instantaneous value is equal to one of said values obtained after division, a pulse $P_i$ is generated by the module 304. In particular, a command pulse P1 is generated at 87.5% of the line duration value Δ, a command pulse P2 is generated if the instantaneous value of the counter is equal 18.75% of the line duration value Δ, a command pulse P3 is generated if the instantaneous value of the counter is equal 25% of the line duration value Δ, a command pulse P4 is generated if the instantaneous value of the counter is equal 37.5% of the line value Δ, and a command pulse P5 is generated if the instantaneous value of the counter is equal 75% of the line duration value Δ.

A state machine 306 allows to generate a command signal 307 on the basis of the signal 302 and the command pulses $P_i$. The command signal 307 is such that it takes a high value between the end of the horizontal synchronization pulse of each video line and the command pulse P1. The command signal 307 is applied to the clock input of a flip-flop 308 which receives the signal 302 at its input data D. As a consequence, when the command signal 307 passes to the high level, the signal Hsync of the flip-flop 308 takes the level of the signal 302 and retains that level as long as the signal 307 remains at the high level, thus suppressing all parasitic pulses in the signal 302. The flip-flop 308 thus performs the function of forcing the level of the signal 302.

The state machine 306 also provides the generation of the signal Vsync. For this purpose, the logic states of the signal 302 between the moments defined by the command pulses P2-P3 and P3-P4 are analyzed by a circuit which carries out a logic function. In particular, the function carried out by the state machine 306 may be formed by a network of logic gates, for example by means of a programmable circuit of the FPGA type. The function carried out by the state machine may also be implemented by a micro-controller which receives instruction codes issued by a computer program stored in a memory.

The invention claimed is:

1. A method of extracting synchronization signals from an input video signal (C sync) comprising horizontal synchronization pulses at the start of video lines, for generating a horizontal synchronization signal (Hsync); said method comprising:
   a calculation step for calculating the duration ($\Delta$) of the video lines in said input video signal (Csync),
   a forcing step for forcing said input video signal (Csync) to an output level, said output level corresponding to the level of said input video signal (Csync) after the horizontal synchronization pulses, said input signal (Csync) being forced between the end of each horizontal synchronization pulse and a moment defined by a first percentage (X1) of said line duration ($\Delta$), for generating said horizontal synchronization signal (Hsync).

2. A method as claimed in claim 1 further comprising a step prior to the calculation step, said prior step comprising:
   a first measuring sub-step for measuring the duration of the low level and the duration of the high level in said input video signal between two consecutive rising edges taken from a set of rising edges of the input video signal (Csync),
   an inversion sub-step for inverting the level of said input video signal (Csync) if the ratio of said duration of the low level to said duration of the high level is higher than 1 for a consecutive set of measurements carried out in said first measuring sub-step.

3. A method as claimed in claim 1 or 2 wherein the calculation step comprises:
   a second measuring sub-step for measuring the durations between the consecutive rising edges taken two-by-two from among a set of rising edges of said input video signal (Csync),
   a processing sub-step for extracting the maximum value from among the durations measured in said second measuring sub-step, said maximum value corresponding to said duration ($\Delta$) of the video lines.

4. A method as claimed in claim 3 where the calculation step is intended to be periodically activated so as to update the value of the duration ($\Delta$) of the video lines.

5. An integrated circuit for extracting synchronization signals from an input video signal (Csync) comprising horizontal synchronization pulses at the start of the video lines, for generating a horizontal synchronization signal (Hsync), said integrated circuit comprising:
   calculation means for calculating the duration ($\Delta$) of the video lines in said input video signal (Csync),
   means for forcing said input video signal (Csync) to an output level, said output level corresponding to the level of said input video signal (Csync) after the horizontal synchronization pulses, said input signal (Csync) being forced between the end of each horizontal synchronization pulse and a moment defined by a first percentage (X1) of said line duration ($\Delta$), for generating said horizontal synchronization signal (Hsync).

6. An integrated circuit as claimed in claim 5 comprising additional means, said additional means comprising:
   measuring means for measuring the duration of the low level and the duration of the high level in said input video signal between two consecutive rising edges taken from a set of rising edges of the input video signal (Csync),
   means for inverting the level of said input video signal (Csync) if the ratio of said duration of the low level to said duration of the high level is higher than 1 for a consecutive set of measurements carried out in said measuring means.

7. An integrated circuit as claimed in claim 5 or 6 wherein calculation means for calculating the duration of the video lines comprise:
   measuring means for measuring the durations between the consecutive rising edges taken two-by-two from among a set of rising edges of said input video signal (Csync),
   processing means for extracting the maximum value from among said set of durations, said maximum value corresponding to said duration ($\Delta$) of the video lines.

8. An integrated circuit as claimed in claim 7 comprising updating means for periodically activating said calculation means.

* * * * *